United States Patent [19]

Fromme

[11] Patent Number: 5,588,165
[45] Date of Patent: Dec. 31, 1996

[54] CUSHIONING ASSEMBLY HAVING PLASTIC SPRINGS FOR SUPPORTING A PAD

[75] Inventor: Heinrich Fromme, Schloss Holte-Stukenbrock, Germany

[73] Assignee: Senne Lizenz & Produkte GmbH, Schloss Holte-Stukenbrock, Germany

[21] Appl. No.: 338,804

[22] Filed: Nov. 10, 1994

[30] Foreign Application Priority Data

Nov. 10, 1993 [DE] Germany ............................ 9317114 U
Mar. 10, 1994 [DE] Germany ............................ 9404021 U
Jul. 30, 1994 [DE] Germany ............................ 9412330 U

[51] Int. Cl.$^6$ ............................ A47C 27/06; A47C 31/12
[52] U.S. Cl. .................... 5/247; 5/255; 5/264.1; 267/106; 267/141; 267/164; 297/452.49
[58] Field of Search .................... 5/246, 247, 255, 5/264.1, 476; 297/452.49; 267/106, 164, 165, 149, 141

[56] References Cited

FOREIGN PATENT DOCUMENTS 0366065  5/1990  European Pat. Off. ............... 5/236.1

Primary Examiner—Alexander Grosz
Attorney, Agent, or Firm—Burns, Doane, Swecker & Mathis, L.L.P.

[57] ABSTRACT

A cushioning assembly comprises a foundation, a plurality of springs mounted on the foundation, and a pad resting on the springs. Each spring is formed of plastic and forms a through-chamber having an axis. The axes of the springs lie in a common plane oriented perpendicular to the loading applied thereto when a user rests on the assembly. Pad-supporting plates are removably attached to the spring bodies, e.g., by clamp members.

16 Claims, 6 Drawing Sheets

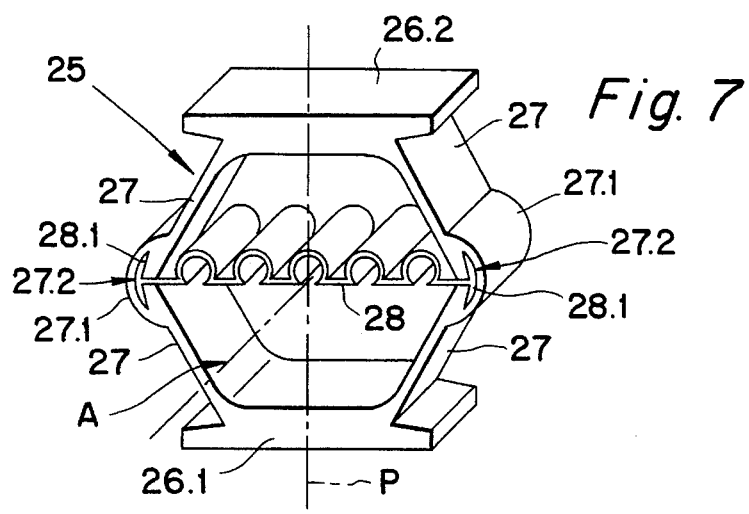
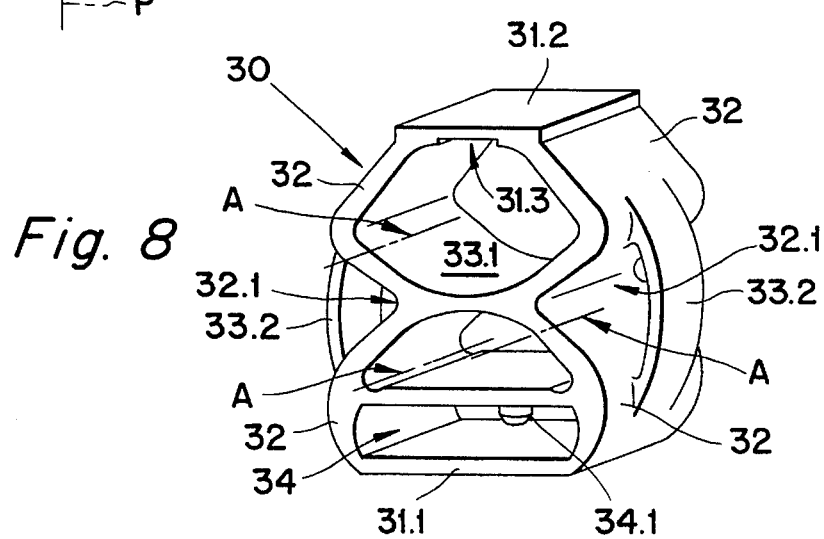
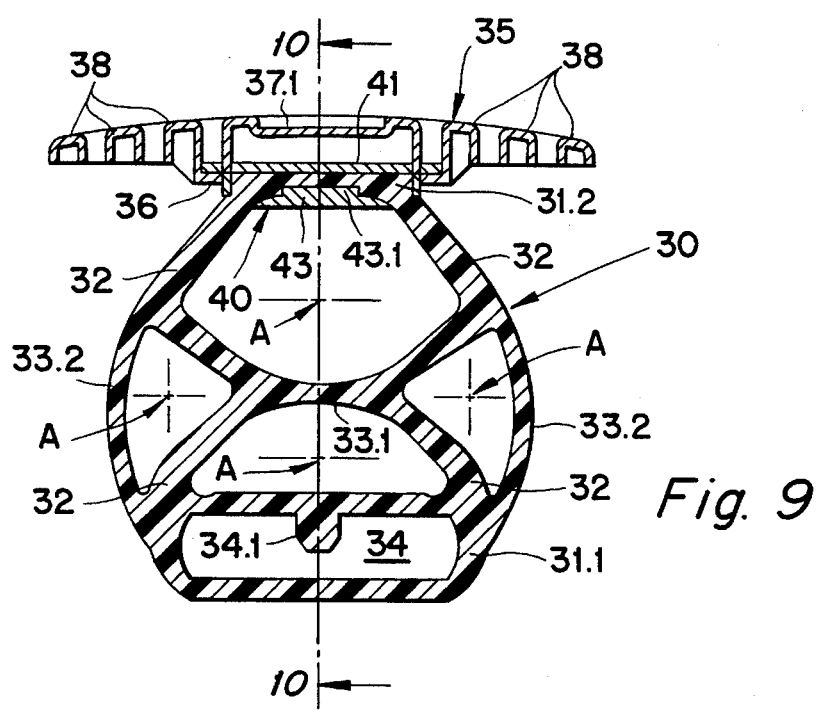

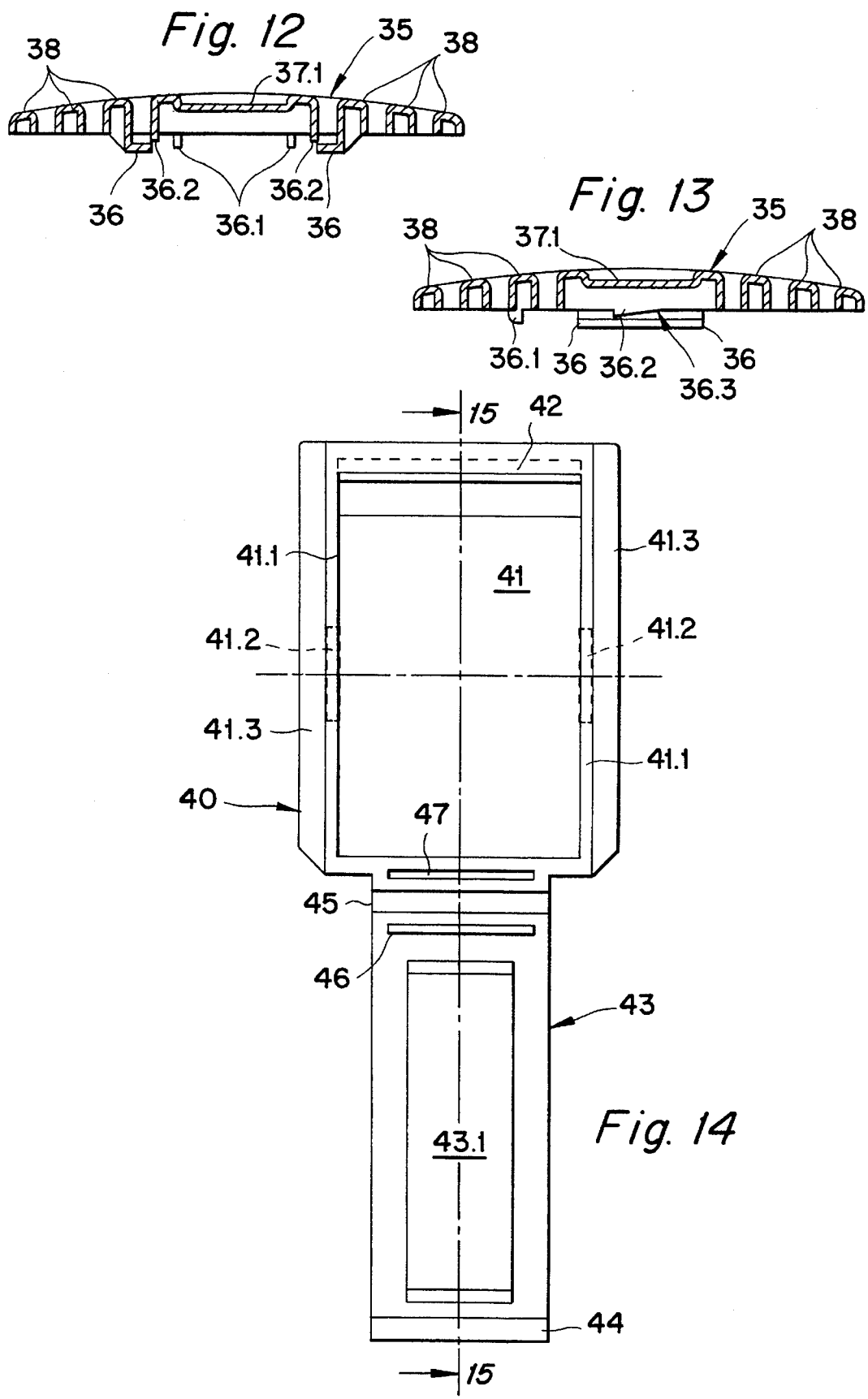

CUSHIONING ASSEMBLY HAVING PLASTIC SPRINGS FOR SUPPORTING A PAD

BACKGROUND OF THE INVENTION

The invention relates to a cushioning assembly for a chair, couch, bed, etc., wherein springs are mounted on a support (foundation), and a pad is laid upon the springs.

Steel springs are often used for cushioning, by being arranged within a pad, the spring-containing pad resting upon a support (e.g., slats). Arranged in regular patterns in the form of spring cores between layers of cushion, the steel springs absorb the forces generated by a user sitting or lying on the pad and adapt to the shape of the body, i.e., the pad is deformed in such a manner that it adapts to the shape of the body in accordance with the distribution of force generated by the position of the user. It is also known to mount the more or less elastic pad on slats, which in turn are mounted in flexible mountings arranged on both sides, and are designed either as rigid solid slats or as flexible laminated wood slats. Thus, the desired and necessary flexibility and adaptability are guaranteed.

Since the steel springs make noise over the course of time in the cushion units, and since the steel springs can break, whereby the tips of the broken springs can penetrate the pad cover and thus disturb a peaceful repose, an attempt has already been made to sew the steel springs individually into sleeves made of material. However, the metal of the springs is attacked by the unavoidable moisture, a condition that can result in the spring breaking following corrosion.

In the case of a slatted base as the foundation, the risk of corrosion can be ruled out through the use of elastic buffers as holding elements in order to support on both sides the rigid or springy slats (EU-A-0 031 132) and the development of noise can be largely suppressed. Even the force that is necessary to deform each slat to a specific degree can be adjusted through a specific design of the cross slats, but no force gradation can be achieved across the width of the slats, especially since here an influence induced by existing moisture cannot be excluded.

To achieve such a gradation of the force, it has already been proposed (EP-A-0 401 712) that the entire surface of the foundation be covered with elastic elements that are positioned in U-profiles in order to avoid an overloading and to limit the available spring excursion. For this surface layering for furniture intended for lying or sitting, such as beds or the like, the support surface for a loose cushion such as a mattress (as already known from DE 36 12 603 A1) is divided into subareas, which are arranged in regular patterns, and each individual spring element of which is designed flexibly. In so doing, the spring elements are affixed to slats, e.g., slats of U-shaped cross section, or trough-shaped slats, which run parallel to the longitudinal bars of the frame. There is provided a suitable mounting mechanism, so that the spring elements can be fixed in position. The free end of these spring elements, i.e., the head, is provided with a supporting plate, which is attached to the head of the spring. The plates limit the extent of spring compression by engaging vertical flanges of the U profiles of the slats in order to preserve the spring elements. However, limiting the extent of spring compression prevents the reclining area from fully adapting to the shape of the reclining body of a human. Also, the mounting of the spring elements on the carrying slats and providing the spring elements with the supporting plates are necessary manufacturing steps that have to be performed manually, and their cost renders the manufacture of such a foundation expensive.

Those are the problems on which the invention is based and according to which a cushion assembly of the aforementioned kind with springs as the foundation is to be improved in such a manner that a cushion assembly having only slightly elastic mattress-like pads can be assembled in a simple manner. The springs are identical and simple to produce and have different, preferably progressive, spring characteristics, by means of which the spring excursion can also be limited for expectant loads. Owing to the simple construction, adaptability of the cushion assembly to varying peculiarities is possible, whereby external influences, such as moisture and the like, are to be ruled out, and wherein the spring characteristics shall also be variable.

SUMMARY OF THE PREFERRED EMBODIMENTS OF THE INVENTION

A spring assembly comprises a foundation, spring elements on the foundation, and a pad resting on the spring elements. Each of the spring elements includes foot and head pieces and a hollow spring body disposed therebetween. The spring body forms a through-chamber having an axis, which is oriented at right angles to the direction of the force of a user loading the spring element and lies in a plane oriented parallel to the pad supporting plate, whereby the spring elements (designed as plastic parts) are mounted on the foundation in rows and columns.

The result of this design is a flexibility owing to the padded seat/couch surface being broken up into individual areas, where these individual areas are specified by the size of the supporting plates of the springs. The spring elements mounted on the foundation cover virtually the entire area of the supporting surface for the mattress and the like, whereby the spring elements are arranged in columns and rows. These spring elements are mounted on the foundation, where a plate extending over the entire reclining surface can be provided as the foundation. Because of the spring effect of the individual spring elements it is immaterial whether the plate is flexible; therefore, a rigid plate can also be used.

In lieu of a plate, slats can be used to form the foundation. Since the spring elements are arranged in rows, an advantageous alternative is to provide for each row a slat, which is arranged in a frame and on which the foot plates of the spring elements are mounted preferably equidistantly. The result is a cushion insert, which is easy to manipulate. The number of slats is determined by the frame size and by the spacing of the slats that is specified by the supporting plate. The slats are attached advantageously to the longitudinal bars of a frame or the like by means of slat hangers, which interact with slat heads slid on the ends of the slats, whereby the slat hangers and/or the slat head caps are designed as preferably extruded plastic parts. The result of this design is a cushion element, where the foundation is formed by slats, on which the spring elements are arranged in columns in such a manner that they form the rows of the padding; in so doing, the slats can be designed; as rigid slats owing to the spring effect of the spring elements.

The result of this design is a cushion element, which is not susceptible to corrosion and suppresses the development of noise. The individual spring elements are divided over the area to be padded in a regular pattern, so that the pressure transferred while sitting or lying is distributed over a plurality of spring elements, so that the shape of the pad resulting from the effect of the force can be well adapted to the shape of the object exerting this force, for example a sitting or reclining human body. At the same time the spring elements exhibit one foot plate each for mounting on the foundation and a supporting plate for laying on a mattress-like pad, which in turn does not require its own spring effect owing to the spring effect of the spring elements; a simple foam cushion suffices.

Alternatively, the foundation can be formed in an advantageous manner by at least two frame sections, whereby adjacent frame sections are hinged together so as to swivel, with joints connecting the respective sections of the longitudinal bars so as to project, the projection corresponding to the height of the spring elements. Thus, a foundation is obtained whose head and/or foot can be swivelled relative to the center section, whereby it is obvious that between the center section, which receives the pelvic region of the body, and the head section another swivellable chest section and/or that the foot section exhibits a section assigned to the thigh region and a section assigned to the lower leg region; the two sections swivelling in such a manner in opposite directions that they cannot impede each other during the swivelling operation when the supporting plates are moved.

To receive a pad, the longitudinal and cross dimensions of the supporting plates of the spring elements are at most equal to the longitudinal distance of the rows and the cross distance of the spring elements within the row. Thus, the surface which is to be padded and on which a pad is placed is covered. In so doing, the adjacent supporting plates must be spaced apart in such a manner that when the supporting plates are tilted owing to force acting on one side, the adjacent supporting plates cannot engage and interlock by means of jamming in such a manner that the spring effect is eliminated. To obtain adequate ventilation below the cushion, the supporting plate is provided with a plurality of openings in the region of the support surface for a mattress-like pad.

Each of the spring elements exhibits a foot, which is provided with means for mounting on the foundation. To fasten the spring elements to the foundation, screw connections or collars, which reach behind, can be provided. Which kind of attachment is the best depends on the design of the spring element, in particular on the foot design. Advantageous attachment means are obtained in that each foot is provided with plugs, which can be inserted into attachment openings of the foundation. Thus, the result is a simple plug system, which renders the manufacture economical. Another possibility lies in the fact that there is a fastening channel, into which the foot is pushed shape-lockingly, whereby this fastening channel can be designed as a groove, which receives the corresponding feet. This fastening channel can be formed by angle strips, slid on the plate or the slats, so that the fastening channel runs continuously in the slide-on direction. In particular, if slats are used as the carriers of the spring elements, the groove or angle channels can also extend at right angles to the direction of the slats, with the result that the possibility of assembly is rendered easier.

As an alternative, the foot of the spring bodies exhibits as the attachment means a slat chamber with an essentially rectangular cross section, so that each of the spring elements can be slid on the slats, whereby preferably a fastening nub (plug) is provided within the slat chamber on the wall facing the spring body. Thus, the possibility of assembling in advance the individual slats with spring elements and fixing the set spring elements in their position is provided, whereby it is obvious that the slat in the desired position is provided with a borehole, which receives the fastening nub and into which these nubs are snapped upon reaching the correct position. For assembly, the spring elements can be slid on the carrying slat, whereby a thin strip of sheet metal is laid on the carrying slat as an assembly aid. This strip of sheet metal prevents the spring elements that are slid on the carrying slat from snapping in before they have reached their final position and thus cannot (or only with difficulty) be moved beyond these lock-in positions that are not assigned to them.

In a preferred embodiment, the spring element is made as one piece with foot and head. In so doing, spring bodies with head and foot are manufactured in one working step, a feature that makes production economical. In another, also preferred embodiment the spring element is designed as multiple parts, whereby at least the head of the spring body can be fastened to the spring body with clamp mountings, and whereby at least the spring body is made of plastic. In so doing, the spring itself is important, whereby the means of the foot for fastening or for fastening the supporting plate can be shaped of a different material, for example, sheet metal. To manufacture, in principle, any process for processing plastic can be used; advantageous is one-piece production in the vulcanization process from rubber, in the molded foam process, in particular, from polyurethane, in the extrusion process from extrudable plastic, whereby the spring element or the spring body is cut into lengths from the extruded strand.

To mount the supporting plate, the head of the spring body must be oriented in such a manner that, first, the supporting plate is held reliably and secondly a good introduction of force is guaranteed. In so doing, it is necessary for economical production that the spring body form a homogeneous body from the selected elastomer. Under these circumstances it is advantageous if a head clamp, which is designed as two halves, is used, with a carrying plate and a locking strap, which are connected by means of a joint, which has the advantageous shape of a foil hinge joint, and both of which exhibit locking means interacting on the side opposite the foil hinge joint, whereby the carrying plate is put into a receptacle under the supporting plates and the locking strap is locked to the carrying plate by reaching under the head of the spring body, thus connecting in an economical manner spring body and supporting plate with simple means. This head clamp can be manufactured from flexible plastic in the injection molding process.

In an advantageous manner the reception for the carrying plate is molded as opposing angle strips under the supporting plate in such a manner that the supporting plate is carried by the angle strips. To ensure the position, there are end stops, which limit the sliding of the supporting plate into the receptacle. It is also advantageous to provide recesses for the stop elements, which interact with the supporting plate, under the supporting plate in such a manner that the supporting plate, put into its final position, can no longer be retracted. Since here the supporting plate must be slid over this snap-in position, it is recommended that the snap-in position be provided with a ramp in order to facilitate pushing up the supporting plate.

As an alternative, the means of the supporting plate are designed as a moveable bracket with stop notch and end stop, so that the carrying plate is limited with respect to its path of insertion and snaps into the end position. To this end the supporting plate exhibits on both sides of the center axis, moveable bracket, end stop and locking means for fastening the carrying plate. In another embodiment the head of the spring body exhibits a reinforcement, under which the locking plate reaches. In so doing, it is advantageous if the reinforcement exhibits a guide groove that is opened towards the inside of the spring body and into which the locking plate of the clamp is laid.

Even the foot can be provided as a separate piece during multiple piece production. In so doing, it is also provided with means that allow it to be mounted on the foundation. These means correspond to those with which the supporting plate is attached to the head of the spring element. In particular, the foot is designed in such a manner that it can be inserted into a slide-in groove or into a guideway, which are formed by the moveable brackets and into which the foot can be put shape-lockingly. In the case of multiple part embodiments spring body and its head and its foot are manufactured independently of each other, whereby a greater freedom in the choice of material is obtained. Spring bodies with varying spring characteristics can be stocked and combined with the heads and feet, a feature that allows the hardness of the cushion to be graduated even within the cushion element.

The spring body of the spring element can be designed in various ways. It is advantageous to design the spring body in such a manner that its cross-sectional shape is essentially cylindrical. Thus, there is an essentially cylindrical cavity, whose manufacture is simple and inexpensive. The cross-sectional shape of the spring body can also be in essence a polygonal, preferably that of a hexagonal polygon. At the same time, head and foot pieces are straight sides of this polygon; what was stated about the cylindrical design also applies to this design.

Another embodiment is designed in that the cross-sectional shape of the spring body is that of an oval or an ellipsoid, which is cut off at its small center axis and its point is flattened off, whereby the foot piece is provided in the region of the cut in the region of the small axis, whereas the flattened off tip forms the head piece receiving the carrying plate. By modifying the cross-sectional shapes, the spring properties can be adapted to the requirements, whereby the spring body is made of an elastomer, advantageously a closed cell elastomer foam. These profiles are open cavity profiles with one chamber. Open profiles of this kind can also be produced in the extrusion process and in the injection molding process as well, whereby both manufacturing methods allow a very economical production of the spring body from the elastomer. It seems obvious that the elastomer can also be foamed.

To modify the spring property, the side walls of the cylindrical spring body or spring body whose basic shape is ellipsoid exhibit an indentation between head and foot piece, so that its cross section assumes the shape of an "eight" that is open in the middle. The degree of this indentation allows the desired spring characteristic to be set with respect to the material and its elastic constant.

Thus, the center indentation can also be designed as a web-like connection, whereby the spring body retains the cross-sectional shape of a true "eight". In this design a two-chamber hollow profile is produced.

Furthermore, it is advantageous in this design, if side connectors are provided that connect the two projecting arches of the "eight" of the spring body, whereby the arches extend at least over one portion of the length of the "eight" of the spring body. These side connectors bridge the indentation, which can be in the center. At the same time the width of the side connectors is such that the side connectors extend at least over one segment of the width of the spring body, whereby the side connectors are arranged in an advantageous manner symmetrically to the central plane of the spring body. Thus, in this embodiment the cavity profile exhibits 4 chambers, of which the side chambers are also provided with inserts made of elastic material, which allows the spring characteristic to he adjusted to the desired values.

Another embodiment is created if each of the spring elements exhibit between head and foot pieces of its spring body a pair of plastic webs, which are simply bent or undulated and whose bend or undulating directions are oriented preferably in such a manner towards one another that both "bends" are indented. With this design a spring body is created whose behavior allows a simple change in its spring characteristic, merely owing to the projection of the bend.

In order to be able to adapt the spring characteristic of the spring body to the requirements, it is also proposed that the spring body exhibit at least one internal reinforcing web, whereby preferably the reinforcing web(s) is/are symmetrical to the plane of the loading force. In so doing, it is possible that the reinforcing web traverses the central plane. As an alternative, it is possible that the reinforcing web is guided on both sides of the center plane from the opposing sides of the spring body to its foot. In so doing, it is advantageous if the web can be inserted, whereby the spring body exhibits at those points at which the reinforcing web(s) start (starts) a chamber, into which the hammer-like ends of the reinforcing web(s) are inserted, whereby it is self-evident that these chambers are formed by external reinforcements.

An advantageous alternative is created by providing the spring body with an elastic, inner supporting body. This inner supporting body can be interchanged in an advantageous manner, so that, if the spring body is the same, its spring characteristic can be changed by merely changing the inner supporting body. This supporting body can be an installed body, which is designed as a prism or cylinder section. Preferably, it has the shape of a cylindrical ring, which is at right angles to the spring body, whereby it is advantageous if the respective axes of the supporting body and spring body form a right angle. This arrangement also allows in a simple manner the insertion of the inner supporting body, whereby, for example, simple moveable brackets on the inside of the head and foot pieces of the spring bodies or spring elements that are one piece at the foot and heat plate permit this insertion. With this design of the spring elements or the spring bodies the goal is reached that each easy to process thermoplastic can be used. The insertable inner supporting bodies are formed in an advantageous manner of a closed cell polyurethane foam. The spring elements, whose spring characteristics are so different, can be used side-by-side in a cushion element, in order to obtain points with weaker and greater flexibility. Since the spring elements can be interchanged, the result is the simple possibility of changing also the condition of these regions by installing harder or softer spring elements, to which end the spring elements are provided advantageously with a mark, for example a special color, by means of which their spring adjustment can be recognized without further ado.

The supporting plate itself is advantageously a ribbed plate, which is made preferably of plastic and which can be produced in the injection molding process. Depending on the desired flexibility, the ribs can extend parallel to the side edges of the supporting plate or "diagonally", so that in the first case the respective diagonal regions are continuous, whereas in the second case this applies to the respective center regions. In so doing, the rigidity of the supporting plate is determined by the continuous regions; the flexibility is determined by the ribbed regions, so that in the first design the supporting plate is altogether stiffer, and that the second design produces a supporting plate, whose corner regions yield to a load. The goal is reached with these ribs as with a number of openings in a non-ribbed supporting plate that there is adequate ventilation under the cushion. Adequate ventilation is also achieved with the non-ribbed supporting plates in that the supporting plate exhibits channels, which, like ventilation channels, allow the air to flow under the cushion and thus cause the desired effect.

BRIEF DESCRIPTION OF THE DRAWINGS

The essence of the invention is explained in detail, with reference to the embodiments depicted in FIGS. 1 to 17:

FIG. 7 is a perspective view of a fourth spring embodiment comprising a polygonal (hexagonal) spring element with an inner reinforcing web designed as a crinkle type spring;

FIG. 8 is a perspective view of a fifth spring embodiment, whose basic shape is ellipsoid, with indented side segments, inner reinforcing web and exterior side connectors;

FIG. 9 is a cross-sectional view of a spring element according to FIG. 8 with a pad-supporting plate attached thereto by a clamp;

FIG. 12 is a sectional view taken along line 12—12 in FIG. 11;

FIG. 13 is a sectional view taken along line 13—13 in FIG. 11;

FIG. 14 is a plan view of a clamp for securing a pad-supporting plate to a spring, the clamp being opened up;

DETAILED DESCRIPTION OF PREFERRED EMBODIMENTS OF THE INVENTION

Figure 10:
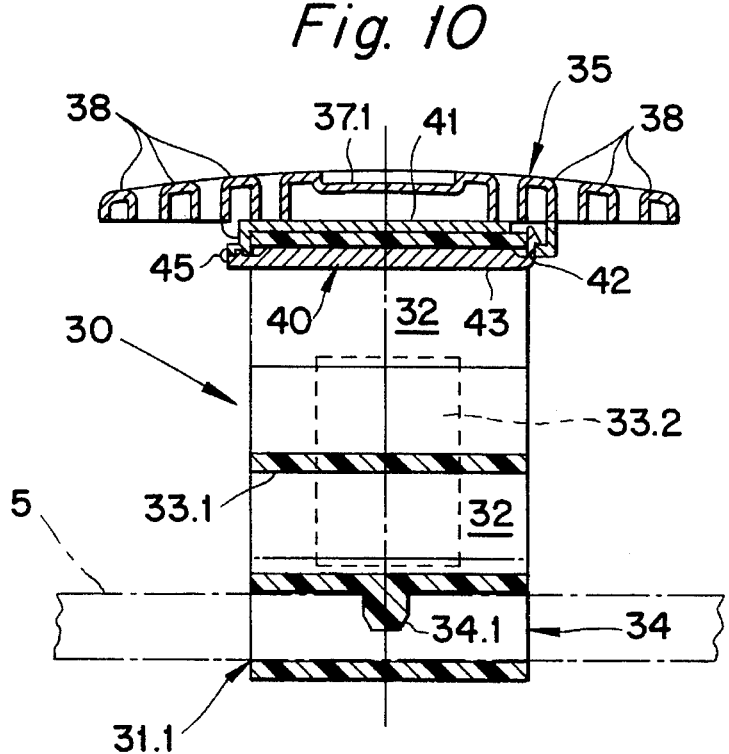
FIG. 10 is a sectional view taken along the line 10—10 in FIG. 9, with a slat shown in phantom lines.
Figure 11:
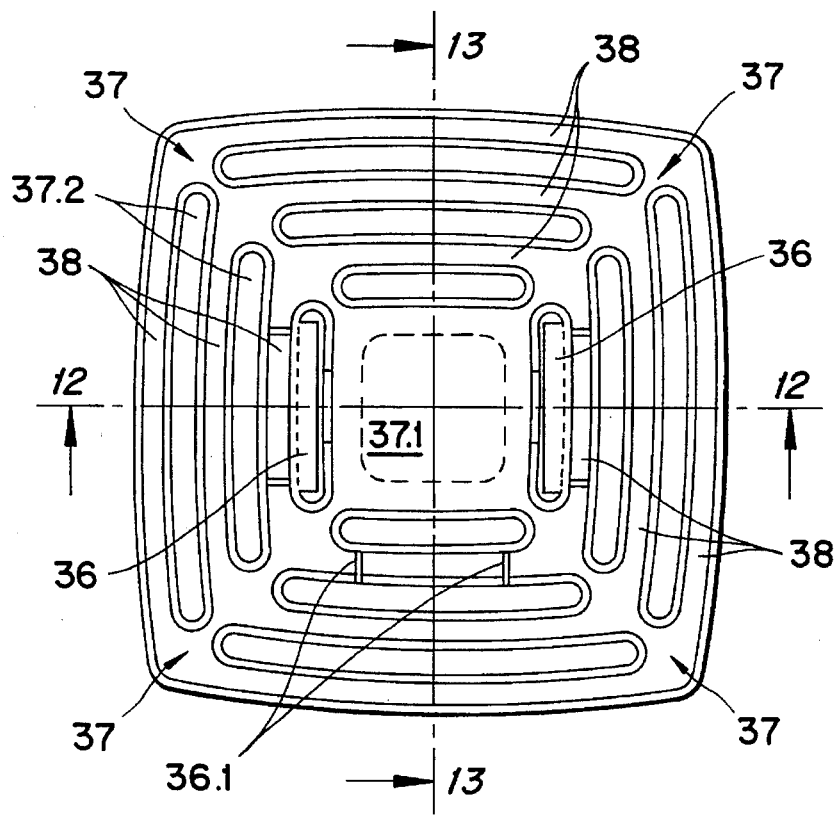
FIG. 11 is a top view of a pad-supporting plate.
Figure 15:
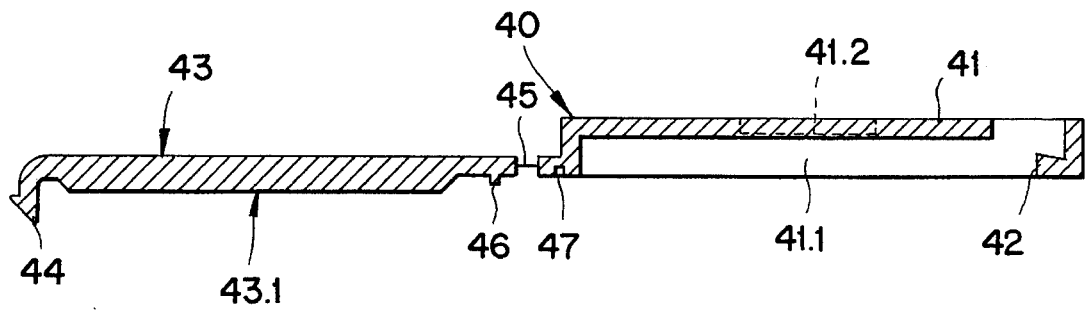
FIG. 15 is a sectional view taken along line 15—15 in FIG. 14.
Figure 16:
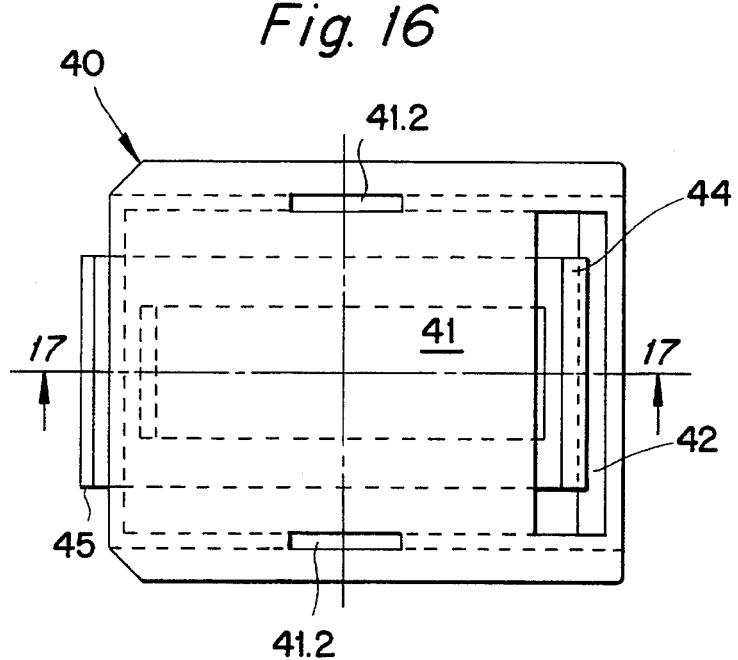
FIG. 16 is a top view of the closed head clamp.
Figure 17:
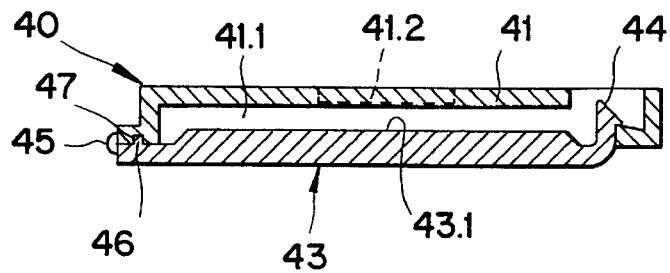
FIG. 17 is a sectional view taken along line 17—17 in FIG. 16.

The present invention provides a cushioning assembly which comprises a foundation, springs mounted on the foundation, and a simple pad (i.e., a pad not containing springs) resting upon the springs. The springs are configured so as to provide the necessary flexibility and eliminate the need to incorporate springs in the pad. Thus, the pad can be a relatively thin, simplistic article, such as a foam mat. Disclosed herein are five preferred spring embodiments 10 (FIGS. 1, 2, and 5), 20 (FIGS. 3 and 4), 20A (FIG. 6), 25 (FIG. 7) and 30 (FIGS. 8–10). Depicted in FIGS. 14–17 is a clamp for securing a pad-support plate to a spring. FIGS. 10–12 depict one embodiment of a pad-support plate. Depicted in FIG. 2 is an embodiment wherein the foundation comprises a plurality of spring-carrying segments that are pivotably interconnected to enable the cushion assembly to more readily conform to the contour of the user.

Figure 1:
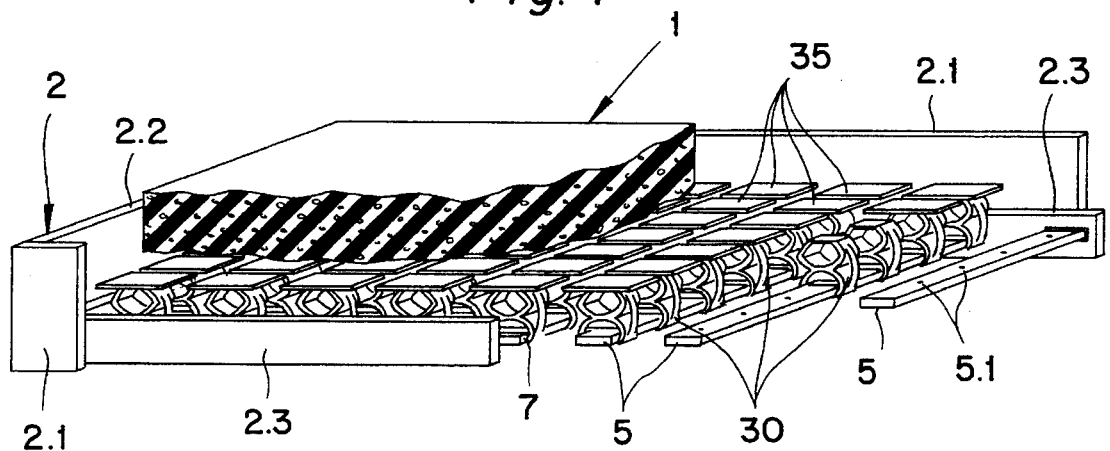
FIG. 1 is a schematic top perspective view of the cushion assembly according to the invention, with parts thereof broken away.
Figure 2:
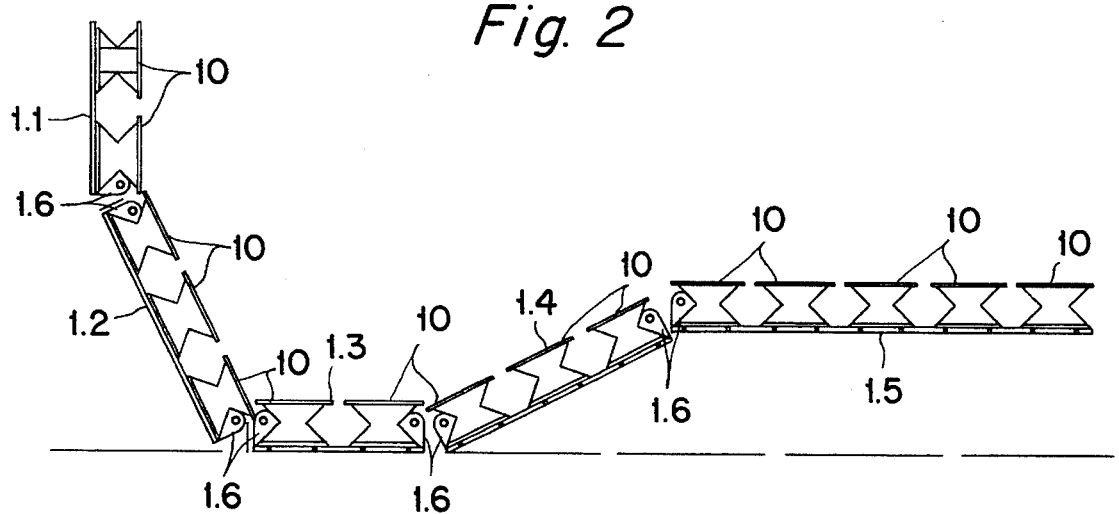
FIG. 2 is a schematic side view of a multipart, adjustable cushion assembly.

FIG. 1 is a simplified, partially cut and fragmented schematic view of a cushion element or assembly 1, which comprises a frame 2, spring elements 30 mounted on the frame, and a pad 8 supported on the springs. By means of the frame 2, formed from opposing cross bars 2.2 (only one being illustrated) and longitudinal bars 2.1, support is provided for the cushion pad 8. To this end, the longitudinal bars 2.1 (illustrated here as side walls of a bed frame) are provided with slat receiving strips 2.3, into whose oblong-like receptacles the heads of the slats 5 are inserted equidistantly. The slats 5 are provided with boreholes 5.1, which serve to fix in position the springs, as will be explained.

One embodiment of the springs 30 will be described later in connection with FIGS. 8–10. Also disclosed are four alternative spring embodiments 10 (FIGS. 1, 2, 5), 20 (FIGS. 3, 4), 20A (FIG. 6), and 25 (FIG. 7).

Figure 3:
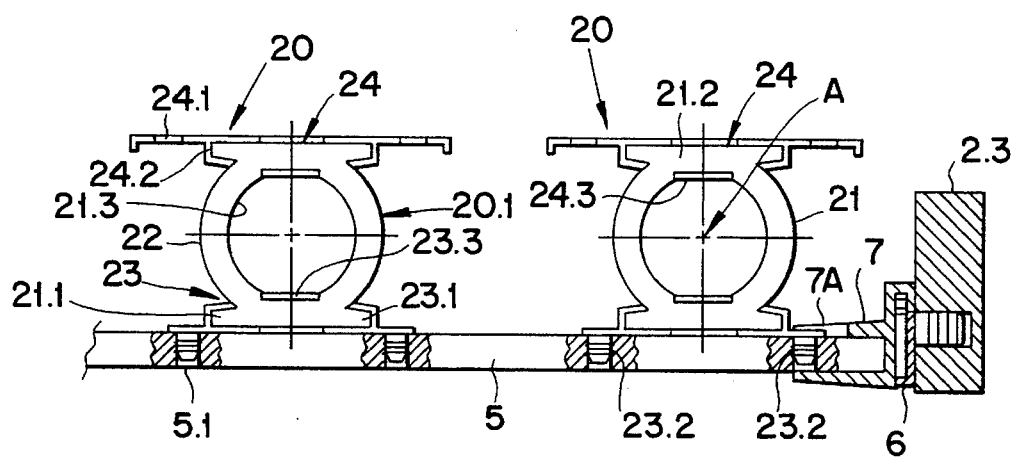
FIG. 3 is a view of two springs according to a first spring embodiment, taken in a direction perpendicular to the slats.

The springs 20 depicted in FIG. 3 constitute three-part springs in that they are composed of an element 20.1, a foot plate 23 mounted at the bottom of the element 20.1, and a pad-supporting plate 24 mounted at the top of the element 20.1. The element 20.1 comprises an elastically compressible spring body 21, an integral foot piece 21.1 disposed at the bottom of the body 21, and an integral head piece disposed at the top of the body 21. The body 21 is hollow and defines a through-chamber 21.3 having an axis A. The axes A of all of the springs lie in a common plane oriented parallel to the supporting plates 24 and perpendicular to the loading applied to the cushion assembly by a user resting thereon.

The foot plate carries plugs 23.2 which fit into the boreholes 5.1 of the slats 5. The slat 5 is installed with its slat head in a slat head receptacle 7, which in turn is suspended in a slat hanger 6 mounted on the frame strip 2.3. The slat head is inserted into the cavity of the slat head receptacle 7, whose upper side facing the supporting plates 24 of the spring elements 20 possess recesses 7A, so that the foot plates 23.1 of adjacent spring elements can be arranged near the frame strip 2.3. The shaped foot 21.1 and shaped head 21.2 are diametrically opposite each other. The foot plate 23 and the supporting plate 24 are in the form of slide-on brackets 23.1 and 24.1, which mate with the correspondingly shaped foot and head pieces 21.1 of the spring body 21. Furthermore, foot plate 23 and supporting plate 24 include clamping tongues 23.3 and 24.3, respectively, which reach behind the foot piece 21.1 or the head piece 21.2 and thus secure the foot plate or the supporting plate in position. The supporting plates 24 are arranged diametrically opposite the foot piece at the head piece of the spring body 21. This supporting plate 24 is essentially flat, and whose outer regions have openings 24.1, which allow, first of all, an air exchange for the air space under the pad 8, and secondly counteracts any slippage of the cushion.

In order to minimize slippage to an even greater extent, the plate 24 is replaced by a supporting plate 35, as shown in detail in FIGS. 11, 12 and 13. That plate 35 has ribs 38 arranged in ribbed region 37 which surrounds a central region 37.1, and which ribs are separated by rib-free regions 37.2. The rib configuration and the rib design (length, width, depth of the U-shape) allow the supporting plates to be designed in such a manner that the desired resilience or stiffness is obtained. The supporting plate 35 is attached to the body 21 by a clamp 40 in a manner to be later explained in connection with FIGS. 9, 10 and 14–17.

Figure 4:
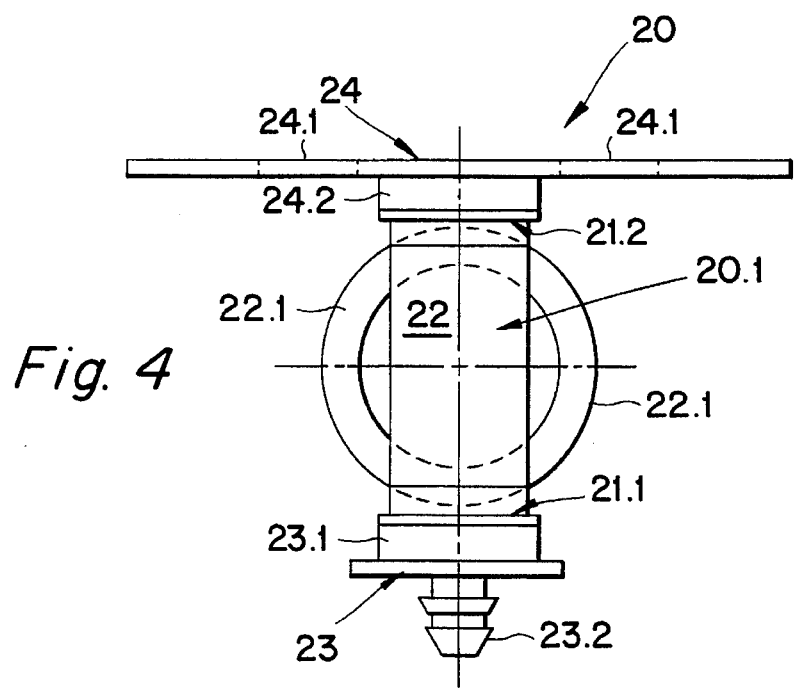
FIG. 4 depicts a view of the FIG. 3 spring, as seen in a direction rotated ninety degrees from that of FIG. 3, i.e., a three-piece spring element with foot plate and supporting plate.

FIG. 4 depicts a spring of FIG. 3 when viewed in a direction perpendicular to the direction in which FIG. 3 is viewed, with the addition of an internal supporting member 22.1. The supporting member 22.1 comprises a ring-shaped spring formed of an elastomeric material (preferably plastic) which is mounted to clamping tongues by U-shaped receptacles (not shown, but similar to the receptacles of FIG. 5). The axis of the ring-shaped spring extends perpendicular to the axis A. The spring 22.1 can be replaced by a similar ring-shaped spring having different spring characteristics, in order to modify the behavior of the spring 20.

Figure 5:
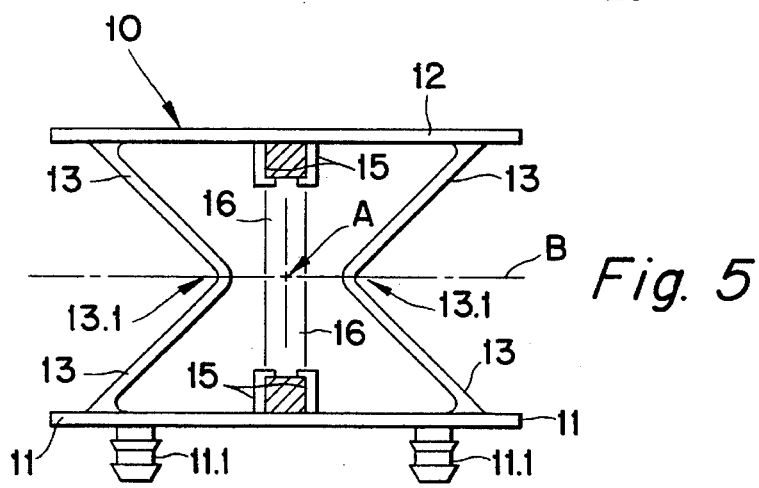
FIG. 5 depicts a second spring embodiment comprising side spring webs and inner supporting body.

FIG. 5 is a side view of a one-piece spring element 10, where the spring body is formed by bent webs 13, which lie in such a manner opposite each other that the directions of the bends 13.1 are directed toward each other. In the drawing there is shown an optional internal spring body 16, similar to the earlier described member 22.1, which can be omitted if the spring webs 13 are suitably designed. The one-piece spring element 10 comprises a plate-shaped base 11 and a pad-supporting plate 12, between which the spring webs 13 extend. The top of the supporting plate 12 is designed flat in order to lay the pad thereon. The foot plate 11 is provided with plugs 11.1, which allow a simple insertion into the boreholes 5.1 in the slats 5 (FIGS. 1, 2) or into those of a plate-shaped foundation. The spring webs 13 are attached to the supporting plate 23 and to the foot plate 22, so that a simple and economical production in plastic is possible, whereby the spring webs 13 are bent symmetrically toward the outside or toward the inside. By choosing this shape and a suitable material, the desired or requisite spring effect is obtained, whereby even undulated designs of the webs are possible. The webs themselves, whose thickness can be chosen, can also be of expanded thickness in the middle. Together with the choice of material the spring characteristic can be determined in this manner. To ensure that the webs will upright themselves even after prolonged use and even after overloading, there can be provided the internal spring body 16 in the form of a ring removably mounted in U-shaped receptacles 15 attached to the foot plate 11 or the supporting plate 12. The ring has an axis B extending perpendicular to axis A. These spring elements can be manufactured to have graduated spring characteristics, so that each cushion assembly 1 can be equipped with individually tuned spring elements, which can also be interchanged, as desired.

Figure 6:
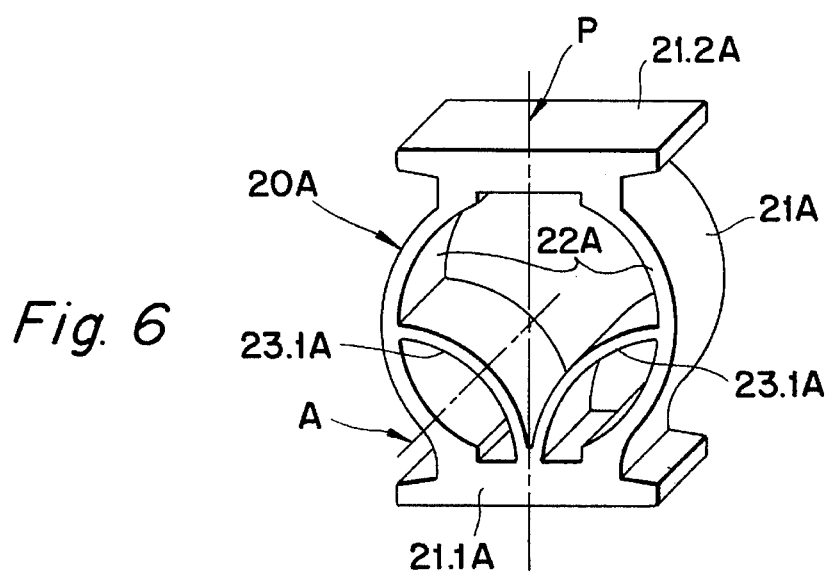
FIG. 6 is a perspective view of a third spring embodiment having inner reinforcing webs.

FIG. 6 shows a spring 20A having a spring body 21A whose basic shape is essentially cylindrical and which has integral foot pieces 21.1A and head pieces 21.2A in order to receive a foot plate and a supporting plate (not illustrated) which would be similar to the plates 23 and 24 described earlier herein. To provide the desired spring characteristic, the spring body 21A is provided with internal reinforcing webs 23.1A, which start at the walls 22A and arch in the direction of the inner wall of the foot piece 21.1A and which are symmetrical relative to the central plane P. The vertical acting force from a user is also in this central plane. The webs are arranged in such a manner that they are uniformly loaded by the force deforming the spring body and function to stabilize the spring body.

FIG. 7 depicts a design of a polygonal spring 25 that is suitable for receiving a foot plate and a supporting plate (not shown) and exhibits integral foot and head piece 26.1 or 26.2, which form receptacles for the foot plate and supporting plate. The basic shape of this spring body 26 is hexagonal. The spring body comprises side walls 27, which are arranged in V-shaped pairs on opposite sides of the central plane P, whereby the foot piece 26.1 and the head piece 26.2 close the polygon. External reinforcing webs 27.1 overlie the apexes of each V-shape so that the bending behavior of this spring body 25 can be influenced by the design of these webs. There can also be provided an internal reinforcing web 28, which intersects the central plane P as an extension spring and is arranged symmetrically to the central plane P. It is advantageous, if the external webs 27.1 form holding pockets, into which the ends of the internal reinforcing web 28 can be inserted and anchored. The ends of the web 28 are preferably in the form of hammerheads 28.1. The V-shaped walls 27 should point outwardly to provide space for the internal web 28. The illustrated internal reinforcing web 28 is designed in the drawing as a crinkle-type extension spring. Alternatively, any kind of draw element can also be used. When the spring 25 is loaded, the web 28 receives the tensile force between the two free corner edges 16 and stabilizes the spring body, whereby this draw element can be adapted to the desired loading conditions by means of its design, choice of material or shape.

FIGS. 8, 9 and 10 depict the multipart spring 30 for spring elements, whose basic shape is essentially semi-ellipsoid and which exhibit a foot 31.1 and a head 31.2, and whose side walls 32 exhibit an indentation 32.1 on both sides. In the illustrated embodiment these two indentations 32.1 are connected together in such manner via an internal cross web 33.1, that vertical loading in the direction of the main axis of the ellipsoid builds up tensile stress in this cross web 33.1, which stabilizes the spring body of the spring element 30. In so doing, the spring body exhibits in the region of its head 31.2 a groove-shaped bay 31.3, in order to become fastened to the carrying plate 35. To fasten the spring 30 to slats 5, this spring has an integral slat chamber 34, so that the spring element 30 can be slid over the slats 5. FIG. 8 is a schematic perspective view of the spring 30; FIG. 9 is a side view of the complete spring assembly with spring 30 and supporting plate 35. FIG. 10 is a fragmentary front view of the spring element with spring body 30 and supporting plate 35, where the slat for carrying the spring bodies 30 (shown with a dashed line in FIG. 10) has not been slid into the slat chamber 34. The term "side view" relates to the open sides of the spring 30, which is formed by the hollow profile segment and from which the spring effect issues. The basic shape of the body of this spring 30 is a semi-ellipsoid, which is truncated in the region of its short semi-axis in order to form the foot piece 31.1 and is designed as slat chamber 34, and whose tip is designed flat as the head piece 31.2. The outer walls 32 are retracted advantageously in such a manner that the indentation 32.1 is centered between foot piece 31.1 and head piece 31.2. The wall thickness of the outer walls 32 of the spring 30 can vary over its height, in order to adjust the spring characteristic and to adapt to the desired conditions. To obtain a reliable seating of the spring elements on the slat 5, the slat chamber 34 includes downwardly projecting fastening nubs or plugs 34.1, which engage with boreholes 5.1 of the slat 5 and thus fasten the spring 30 onto the slat.

The head piece 31.2 of the spring 30 is connected by a clamp 40 to the supporting plate 35, which is shown in detail in FIGS. 11, 12 and 13. To this end, the head piece 31.2, the supporting plate 35 and the head clamp 40 (shown in detail in FIGS. 14 to 17) are designed in such a manner that a carrying plate 41 and a locking strap 43 of the head clamp 40 envelop the head piece 31.2 of the spring 30, whereby the groove-like depression 31.3 (See FIG. 8) in the head piece 31.2 forms a guide groove for the locking strap 43 and receives a projection 43.1 of the locking strap. In the supporting plate 35, the ribs 38 are separated by cavities 37.2, so that there is adequate free space to ventilate behind the pad 8, which presses simultaneously into the cavities, so that this cushion is "anchored" to the supporting plate 35, to resist slippage of the pad 8.

The carrying plate 41 of the head clamp. 40 rests on the guide bracket 36 (see FIG. 9), which is attached to the supporting plate 35 and onto which the head clamp 40 is slid during assembly. End stops 36.1 of the plate 35 (see FIGS. 12, 13) prevent the head clamp from being slid too far. To prevent the head clamp 40 from being pulled back, the supporting plate 35 has locking means (which are shown in detail in FIGS. 14 and 15) and which comprises a locking nose 36.2 with ramps 36.3, which interact with recesses 41.2 formed in the corresponding side members of the carrying plate 41 of the head clamp 40. Carrying plate 41 and locking strap 43, which are connected together so as to swivel via a foil hinge 45, are locked together via locking brackets 42 and locking noses 44 during assembly, so that both are rigidly connected together following assembly. At the same time, springs, which extend into grooves 47, ensure that the locking strap is in the proper position during the locking operation.

All of these embodiments have in common a simple shape, which enables an economical production. This simple shape is an outflow of the symmetry, which is advantageous for employment, relative to the vertical plane, which divides the spring element centrally into two symmetrical halves. By choosing a suitable material and geometry, the spring properties can be readily adapted to each individual case, whereby the characteristic progression can be influenced through the choice and design of the reinforcements that may or may not be used. At the same time, the shape can be such that the wall thickness of the side walls and the reception for the head and foot of the spring at the edge is (slightly) smaller than in the center, in order to guarantee a slight deformation during production in a mould, for example during foam molding. However, it is also possible to maintain uniform wall thicknesses throughout, a state that enables production by an extrusion process, whereafter the spring elements are merely cut into lengths. Particular importance was placed on the simple assembly, which was obtained by means of simple locking connections.

In the embodiments depicted up until now, the ability of the cushioning assembly to conform to the shape of the user's body has been provided by the flexibility of the springs and pad. In FIG. 2, an alternative embodiment is depicted wherein the foundation is flexible. Basically, the foundation comprises sections 1.1, 1.2, 1.3, 1.4 and 1.5. Section 1.1 defines a head section for carrying springs that support a user's head; section 1.2 defines a back section for supporting a user's back; section 1.3 is preferably stationary and defines a pelvic section for supporting a user's pelvis; section 1.4 defines a thigh section for supporting a user's thigh; and section 1.5 defines a lower leg section for supporting a user's lower leg. The sections are hinged together by hinges 1.6 for relative swiveling motion about horizontal axes. The hinges 1.6 keep the springs of adjacent sections far enough apart to keep the pad-supporting plates thereof from abutting one another during relative swiveling motion, thereby avoiding jamming. Each section of the foundation could comprise a flat plate, or slats extending longitudinally or laterally. The sections could be mounted to motor-driven links which enable the sections to be power-swiveled to various orientations.

The adjacent frame sections are thus hinged together so as to swivel with joints connecting the respective sections of the longitudinal bars so as to project, the projection corresponding to the height of the spring elements. Thus, a frame is obtained whose head and/or foot can be swivelled relative to the center section, whereby it is obvious that between the center section, which receives the pelvic region of the body, and the head section, another swivellable chest section and/or that the foot section exhibits a section assigned to the thigh region and a section assigned to the lower leg region; the two sections swivelling in such a manner in opposite directions that they cannot impede each other during the swiveling operation when the supporting plates are moved.

The body of each of the springs 10, 20, 20A, 25 and 30 is formed of plastic. Also, the foot plates and supporting plates which are mounted on the spring bodies can be formed of plastic. The type of plastic which is used depends upon the degree of elasticity desired.

Although slats 5 have been described in the preferred embodiments as the foundation upon which the spring are mounted, there could be instead used a large flat plate which would take the place of all slats. The springs would be mounted on the plate. If slats are used, they will preferably underlie substantially the entire area of the pad. That will also be the case if a plate is used as the foundation.

The springs are preferably oriented such that their axes A are either aligned or mutually parallel. Alternatively, some of the springs can have their axes A oriented perpendicular to axes A of other springs.

The pad can be of any suitable type, such as a foam mat, and may comprise a pad for a chair, sofa or bed (mattress).

Although the invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A cushioning assembly, comprising:

a foundation; and a plurality of springs mounted on said foundation, said springs arranged in substantially parallel rows, each row including two springs arranged adjacent respective ends of the row and a plurality of springs disposed between said two springs, whereby said springs of all of said rows together define a support area adapted to support a pad, each spring comprising:

an elastically compressible portion formed of plastic and comprising a hollow body forming at least one through-chamber defining an axis, a mounting portion disposed at a bottom of said elastically compressible portion and including structure for connection with said foundation, and a pad-supporting plate disposed at a top of said elastically compressible portion and adapted for supporting a pad;

said axes of said springs lying in a common plane oriented parallel to said pad-supporting plates and perpendicular to a loading applied to the spring assembly by a user, wherein said foundation comprises a plurality of parallel slats, said springs being mounted along said slats, said springs mounted on each slat defining one of said rows, said mounting portion forming a slat chamber extending completely through said spring and through which a slat extends.

2. A cushioning assembly according to claim 1, wherein said elastically compressible portion, said mounting portion, and said pad-supporting portion are of integral one-piece construction.

3. A cushioning assembly according to claim 1, wherein said pad-supporting plate is slidable directly onto said head piece.

4. The cushioning assembly according to claim 1, wherein said foundation comprises at least two parts hinged together by hinges to accommodate relative movement therebetween about a horizontal axis, each of said parts carrying a plurality of said springs.

5. The cushioning assembly according to claim 4, wherein the hinges have a height corresponding substantially to a height of said springs.

6. A cushioning assembly, comprising:

a foundation; and a plurality of springs mounted on said foundation, said springs arranged in substantially parallel rows, each row including two springs arranged adjacent respective ends of the row and a plurality of springs disposed between said two springs, whereby said springs of all of said rows together define a support area adapted to support a pad, each spring comprising:

an elastically compressible portion formed of plastic and comprising a hollow body forming at least one through-chamber defining an axis, said elastically compressible portion further including an integral head piece disposed at a top thereof, a mounting portion disposed at a bottom of said elastically compressible portion and including structure for connection with said foundation, a pad-supporting plate disposed at a top of said elastically compressible portion and adapted for supporting a pad, said pad-supporting portion comprising a supporting plate attached to said head piece, and a clamp for securing said supporting plate to said head piece;

said axes of said springs lying in a common plane oriented parallel to said pad-supporting plates and perpendicular to a loading applied to the spring assembly by a user.

7. A cushioning assembly for supporting a user, comprising:

a foundation including a plurality of parallel slats; and a plurality of springs mounted on said slats, each spring comprising:

an elastic compressible portion formed of plastic and comprising a hollow body having a general shape of the number 8 forming at least two through-chambers defining two axes, respectively, the shape of the number eight being viewed in a direction along said axes, a mounting portion disposed at a bottom of said elastically compressible portion and including a slat chamber through which a respective slat extends for connecting said spring to said foundation, a head piece disposed at a top of said elastically compressible portion, and a pad-supporting plate disposed on said head-piece for supporting a pad;

said axes of said plurality of springs lying in a common plane oriented parallel to said pad-supporting plates and perpendicular to a loading applied to the spring assembly by a user.

8. A cushioning assembly according to claim 7, wherein said mounting portion includes a downwardly projecting plug extending into said slat chamber and into a hole formed in a respective slat.

9. A cushioning assembly according to claim 7, wherein said body shaped generally as a number 8 includes a pair of side-walls having indentations formed therein, and each side-wall including an arch extending across said indentations outside of said through-chambers.

10. A cushioning assembly according to claim 7, wherein said elastically compressible portion, said mounting portion, and said head-piece are of one-piece integral construction.

11. A cushioning assembly according to claim 10, further including a clamp for mounting said pad-supporting plate to said head-piece.

12. A cushioning assembly according to claim 11, wherein said clamp includes upper and lower parts hinged together at a first end of each of said first and second parts, said first part being positioned above said head piece, said second part being positioned below said head piece, second ends of said first and second parts forming a snap-lock structure for holding said second ends together.

13. A cushioning assembly according to claim 11, wherein said pad-supporting plate includes downward projections receivable in recesses of said clamp for resisting removal of said pad-supporting plate therefrom.

14. A cushioning assembly according to claim 13, wherein said downward projections are shaped as ramps to facilitate the insertion of said pad-supporting plate into said clamp.

15. A cushioning assembly according to claim 10, wherein said pad-supporting plate includes ventilation recesses adapted to receive portions of a pad for resisting sliding movement of the pad relative to said pad-supporting plate.

16. A cushioning assembly according to claim 15, wherein said recesses extend generally parallel to respective side edges of said pad-supporting plate.

* * * * *